(No Model.)
A. WEBER.
CHUCK FOR HOLDING GATE VALVES.
No. 300,927. Patented June 24, 1884.
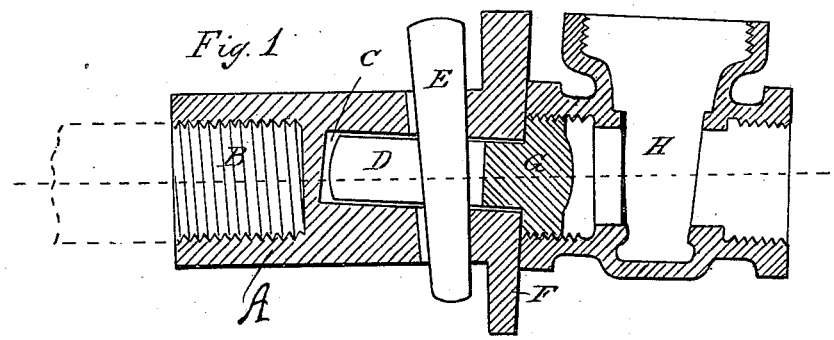
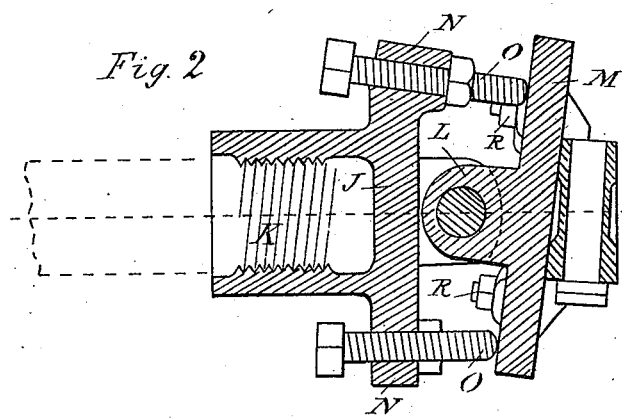
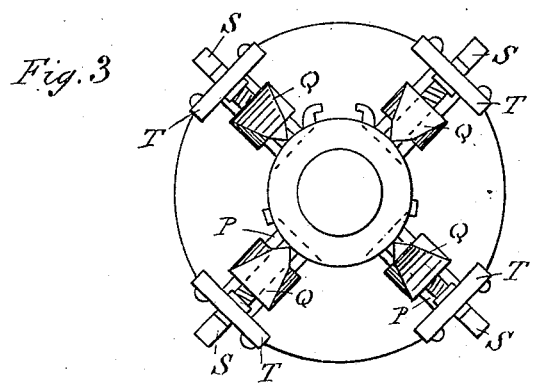
Attest
J. Paul Mayer
E. Scully
Inventor
Adolph Weber
By Thos. S. Sprague
Atty

UNITED STATES PATENT OFFICE.

ADOLPH WEBER, OF DETROIT, MICHIGAN.

CHUCK FOR HOLDING GATE-VALVES.

SPECIFICATION forming part of Letters Patent No. 300,927, dated June 24, 1884.

Application filed December 12, 1883. (No model.)

*To all whom it may concern:*

Be it known that I, ADOLPH WEBER, of Detroit, in the county of Wayne and State of Michigan, have invented new and useful Improvements in Chucks for Holding Gate-Valves; and I do hereby declare that the following is a full, clear, and exact description thereof, reference being had to the accompanying drawings, which form a part of this specification.

This invention relates to certain new and useful improvements in chucks for holding a gate-valve while turning off and finishing its opposite faces; and it consists in the peculiar combinations, and the construction and arrangement of parts, as hereinafter more fully described, and then pointed out in the claim.

Figure 1 is a central longitudinal section of a chuck for holding the cage while the inclined valve-seats are being turned and finished. Fig. 2 is a central longitudinal section of a chuck for holding the gate while its inclined faces are being turned and finished to accurately fit the seats of the cage. Fig. 3 is a face view of the chuck shown in section in Fig. 2.

In the accompanying drawings, which form a part of this specification, A represents the body of a chuck provided with a threaded socket, B, by means of which to secure the chuck to the lathe-head. Eccentric to the axis of this chuck there is bored longitudinally and in the opposite end another socket, C, to receive the end of the spindle D, which, when inserted, is secured in place by the key E. The face F of this chuck is turned off at an angle to the body of such chuck. The spindle D terminates in a threaded head, G, designed to engage with the female thread of the water-way at one side of the cage H. The axis of the body of the chuck must be coincident with the center of the annular valve-seat of the cage which is presented for turning off and finishing, and when this is done the cage is removed and changed end for end, and secured to the end of the spindle to turn off and finish the opposite seat on the same angle or incline.

To hold the gate-valve while turning off and finishing its opposite faces upon the same incline as that given to the annular seats of the cage, I employ a chuck constructed as follows: J represents the body of the chuck provided with an interiorly-threaded socket, K, by means of which the chuck is secured to the lathe-head in axial line therewith. To the end of this body, by a suitable joint, L, there is pivotally secured the face M, and through ears N on the body set-screws O are employed to give any inclination to the face. Recesses P are cut through this face from the periphery to receive the jaws Q, which are employed to hold the gate in place on said face, set-screws R being used to tighten the jaws, and set-screws S, through resistance-plates T on the periphery of the head, being employed to secure a radial adjustment of the points to enable the same chuck to be employed in finishing gates of different sizes.

In practice, one face of the gate is finished in the usual way, and the finished face centered upon the face of the chuck. Then, by means of the set-screws O, the face-plate of the chuck is inclined until the exposed face of the gate stands vertical to the horizontal axis of the body of the chuck, when this face is turned off. The gate is then removed from the chuck and tried in the cage, when possibly it may be found that the inclined faces of the seats and of the gate are not quite coincident. Now, instead of running in soft metal, as heretofore has been the practice, the points of difference are noted on the gate, and the same is again chucked, the face-plate adjusted to correct these points, and the finishing completed by the turning-tool; and this operation is repeated until a perfectly-fitting tight joint is obtained when the gate is seated in the cage. This adjustment of the face-plate being once accurately obtained, there is no further difficulty in finishing any number of gates to accurately fit a like number of cages, which have been fitted on the chuck first described. By thus finishing a straight-way valve with inclined valve-seats and valve-gates, perfect accuracy of fitting is obtained at a minimum of cost of labor and material.

I make no claims in this application to the chuck shown in Fig. 1, as it may form the subject-matter of a separate application.

What I claim as my invention is—

A chuck for the purpose described, consisting of a body provided with the means, substantially as described, for securing said body to a lathe-head, an adjustable face-plate pivotally secured to said body, screws for adjusting the inclination of said face-plate, holding-points projecting through said face-plate, and the means, substantially as described, for radially adjusting said points, substantially as specified.

ADOLPH WEBER.

Witnesses:
H. S. SPRAGUE,
E. SCULLY.